ROBERT W. BURBY
FRANK R. MERRIAM JR.
*INVENTORS*

BY *John R. Faulkner*
*Keith L. Jerschling*

ATTORNEYS

June 26, 1962 — R. W. BURBY ET AL — 3,041,488
DYNAMOELECTRIC MACHINE
Original Filed June 30, 1958 — 2 Sheets-Sheet 2

ROBERT W. BURBY
FRANK R. MERRIAM, JR.
INVENTORS

BY John R. Faulkner
Keith L. Gerschling
ATTORNEYS

United States Patent Office 3,041,488
Patented June 26, 1962

3,041,488
DYNAMOELECTRIC MACHINE
Robert W. Burby, Ypsilanti, and Frank R. Merriam, Jr.,
Plymouth, Mich., assignors to Ford Motor Company,
Dearborn, Mich., a corporation of Delaware
Original application June 30, 1958, Ser. No. 745,634.
Divided and this application Aug. 5, 1959, Ser. No.
831,767
5 Claims. (Cl. 310—238)

This invention relates to a dynamoelectric machine and more particularly to a series wound direct current motor.

This application is a division of our co-pending application S.N. 745,634, filed June 30, 1958.

Although not so limited, the present invention is particularly applicable to a series wound direct current electric motor and will be described in relation thereto. This type of motor may be employed as a driving means for a vehicle window lift actuator. Electric motors so employed must be compact and shaped to fit into the relatively small space available between the door panels. The electric motor of the present invention is admirably suited to fulfill the above mentioned requirements. The motor is made square in cross section, thus gaining maximum volume and power from a motor which must fit into a space of fixed width. Two sections of the casing for the motor are fastened together by means of external bolts and the brush card holders are fixed relative to the motor frame by securing them to the laminated frame of the motor through the rivets which hold the frame laminations together.

An object of the invention is the provision of a dynamoelectric machine in which the brush card holder is secured to the frame through the means that holds the frame laminations together.

Other objects and attendant advantages of the present invention will become more apparent as the specification is considered in connection with the accompanying drawings in which.

Figure 1:
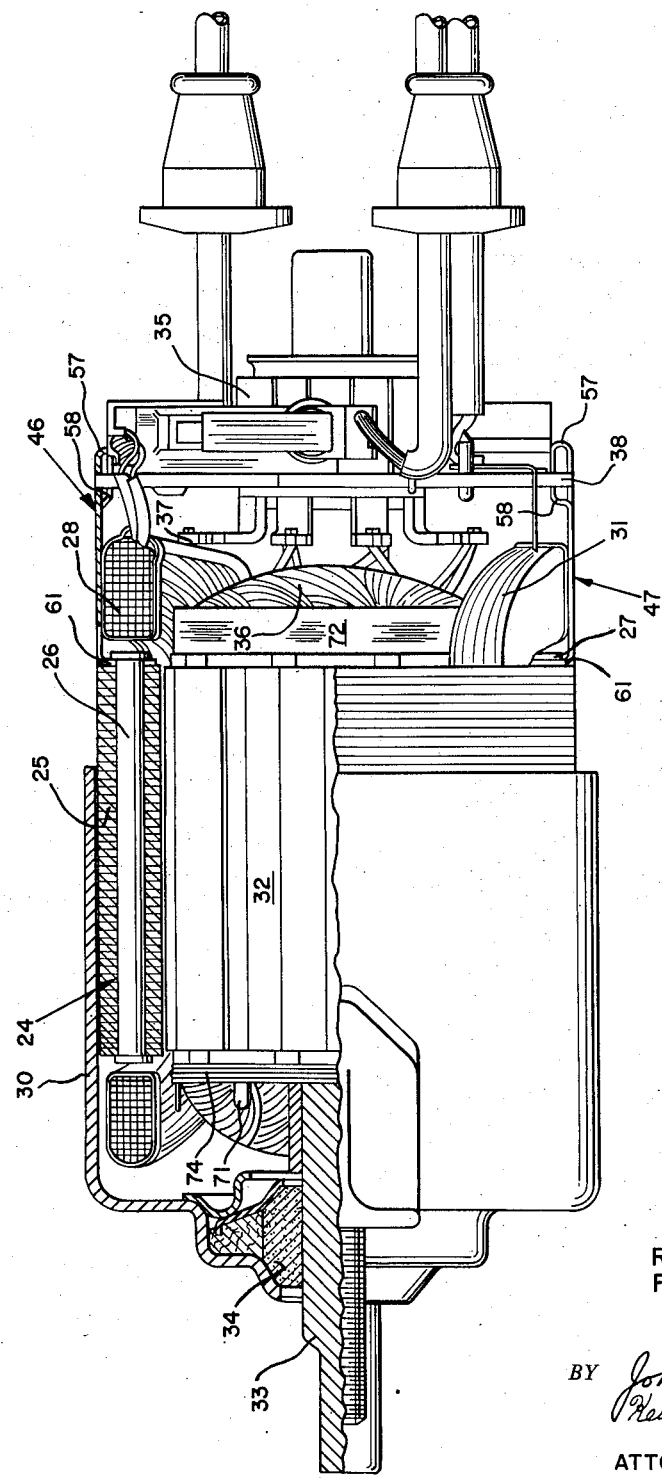
FIG. 1 is a partial longitudinal sectional view of the invention with one of the casing sections removed.
Figure 2:
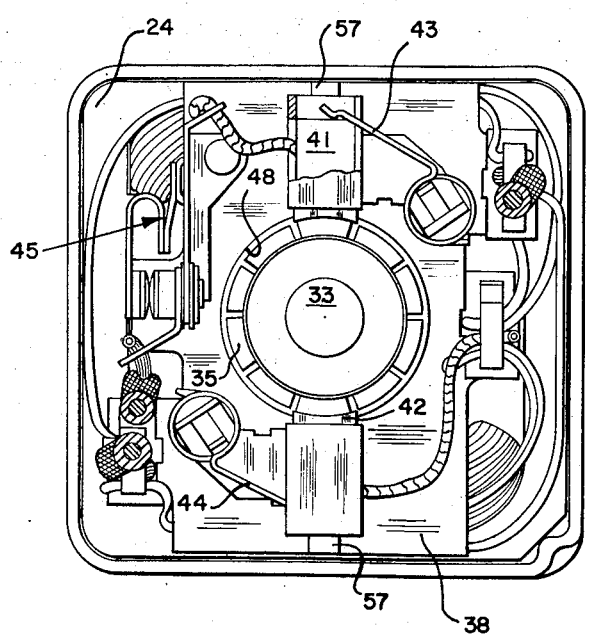
FIG. 2 is an end elevational view of the invention with one of the casing sections removed.

By reference to FIGS. 1 and 2 it can be seen that the motor frame 24 is comprised of a plurality of laminations 25 having an outer periphery of generally square configuration fastened together by means of axially extending rivets 26 and 27 and that a pair of field windings 28 and 31 are wound upon the frame to furnish the field for the motor. The armature 32 of the motor is mounted upon a shaft 33 which is supported in the frame by means of permanently lubricated sleeve bearings one of which is shown at 34 mounted in the casing sections one of which is shown at 30. A commutator 35 is suitably mounted upon the shaft 33 and is electrically connected to armature windings 36 by means of soldered connections shown at 37.

A brush card 38 (FIGURES 1 and 2) having mounted thereon a pair of brushes 41 and 42, urged against the commutator 35 by a pair of suitable springs 43 and 44, and a thermostatic circuit breaker 45, is positioned over the commutator by means of a pair of brush card holders generally designated by the numerals 46 and 47. The brush card 38 has a central aperture 48 of larger diameter than the commutator 35 to receive the commutator so that it may rotate freely with respect thereto.

Figure 3:
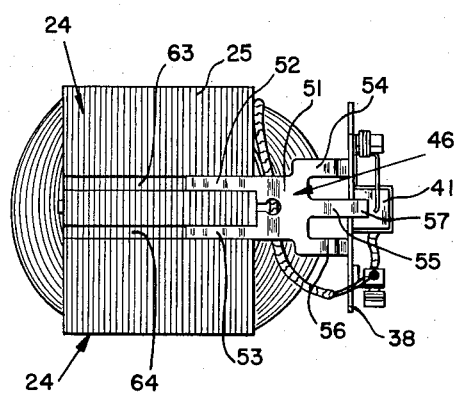
FIG. 3 is a plan view showing the frame, the brush card and the brush card holder of the present invention.
Figure 4:
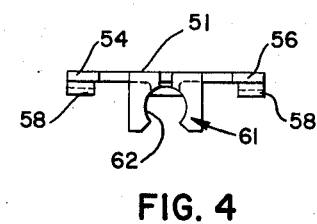
FIG. 4 is an end view of the brush card holder employed with the present invention.

The details of the brush card holders and their relation to the rest of the motor may be readily seen by reference to FIGS. 1, 3 and 4. Each brush card holder is constructed of spring steel, for example, SAE 1060 or 1065 and has a main body portion 51 with a pair of rearwardly extending tongues 52 and 53 and three forwardly extending tongues 54, 55 and 56. The middle forwardly extending tongue is provided with a hooked portion 57 while each of the outboard tongues has an inwardly extending forward extremity 58 which lies in the same plane as part of the hooked portion of the middle tongue. Extending in a plane perpendicular to the plane of the main body of the brush card holder is a bifurcated tab 61 having a central aperture 62 for receiving the rivets 26 and 27. As can best be seen by reference to FIGS. 1 and 3, the frame 24 of the motor has a pair of slots 63 and 64 for receiving the tongues 52 and 53, the bifurcated tab 61 snaps over the body of the rivets 26 and 27 between the rivet head and the frame, the middle forwardly extending tongue 55 passes over the top of the brush card with the hooked portion 57 engaging the front of the brush card 38, and the downwardly extending forward extremities 58 of each of the outboard tongues 54 and 56 engage the back of the brush card. Thus the brush card 38 is held firmly in place by the two brush card holders 46 and 47.

The present invention thus provides brush card holders for a dynamoelectric machine that firmly hold a brush card within the machine.

It will be understood that the invention is not to be limited to the exact construction shown and described, but that various changes and modifications may be made without departing from the spirit and scope of the invention, as defined in the appended claims.

What is claimed is:

1. In a dynamoelectric machine having a laminated frame and an armature including a commutator, the combination comprising a plurality of brushes, a brush card for supporting the brushes in contact with the commutator, means for securing the laminations of the frame together, a brush card holder comprising a main body portion, a bifurcated tab depending from said main body, said bifurcated tab fitting over the means for securing the laminations of the frame together, a plurality of tongues extending from the main body portion toward said brush card, one of said tongues having a hooked portion engaging one side of said brush card, and the other of said tongues engaging the other side of the brush card.

2. In a dynamoelectric machine having a laminated frame, means for securing said laminated frame together, an armature including a commutator mounted for rotation within said frame, a plurality of brushes and a brush card holder for supporting the brushes in contact with said commutator, the improvement comprising a brush card holder having a main body portion, a bifurcated tab extending at substantially right angles to said main body portion, a plurality of tongues extending toward said brush card, one of said tongues having a hooked portion engaging one side of said brush card, the other tongues having a depending extremity engaging the other side of said brush card, said bifurcated tab fitting over said means for securing the laminated frame together so that said brush card holder is rigidly supported against said frame.

3. In a dynamoelectric machine having a laminated frame, means for securing said laminated frame together, an armature including a commutator mounted for rotation within said frame, a plurality of brushes and a brush card for supporting the brushes in contact with said commutator, the improvement comprising a brush card holder having a main body portion, a bifurcated tab extending at substantially right angles to said main body portion, said bifurcated tab fitting over said means for securing the laminated frame together, a plurality of tongues extending from said main body portion toward said brush card, one of said tongues having a hooked portion engaging one side of said brush card, the other tongues having a depending extremity engaging the other side of said brush card, said main body portion having a plurality of tongues extending away from said brush card, said frame having a plurality of slots for receiving said tongues.

4. In a dynamoelectric machine having a laminated frame and an armature including a commutator, the combination comprising a plurality of brushes, a brush card for supporting the brushes in contact with the commutator, means for securing the laminations of the frame together, a brush card holder comprising a main body portion, a bifurcated tab depending from said main body, said bifurcated tab fitting over the means for securing the laminations of the frame together, three spaced tongues extending from the main body portion toward said brush card, the central one of said tongues having a hooked portion engaging one side of said brush card, and the other two tongues engaging the other side of the brush card.

5. In a dynamoelectric machine having a laminated frame, means for securing said laminated frame together, an armature including a commutator mounted for rotation within said frame, a plurality of brushes and a brush card holder for supporting the brushes in contact with said commutator, the improvement comprising a brush card holder having a main body portion, a bifurcated tab extending at substantially right angles to said main body portion, a plurality of tongues extending toward said brush card, one of said tongues having a hooked portion engaging one side of said brush card, the other tongues having a depending extremity engaging the other side of said brush card, said hooked portion engaging one side of said brush card and the depending extremities of the other tongues engaging the other side of the brush card lying substantially in the same plane, said bifurcated tab fitting over said means for securing the laminated frame together so that said brush card holder is rigidly supported against said frame.

References Cited in the file of this patent
UNITED STATES PATENTS

| | | |
|---|---|---|
| 1,686,324 | Hillix | Oct. 2, 1928 |
| 2,324,299 | Haifley | July 13, 1943 |
| 2,763,800 | Curley | Sept. 18, 1956 |
| 2,780,744 | Carneck | Feb. 5, 1957 |